C. A. BUNKER.
LAUNDRY REGISTERING APPARATUS.
APPLICATION FILED AUG. 14, 1916.
1,311,315.
Patented July 29, 1919.
7 SHEETS—SHEET 4.
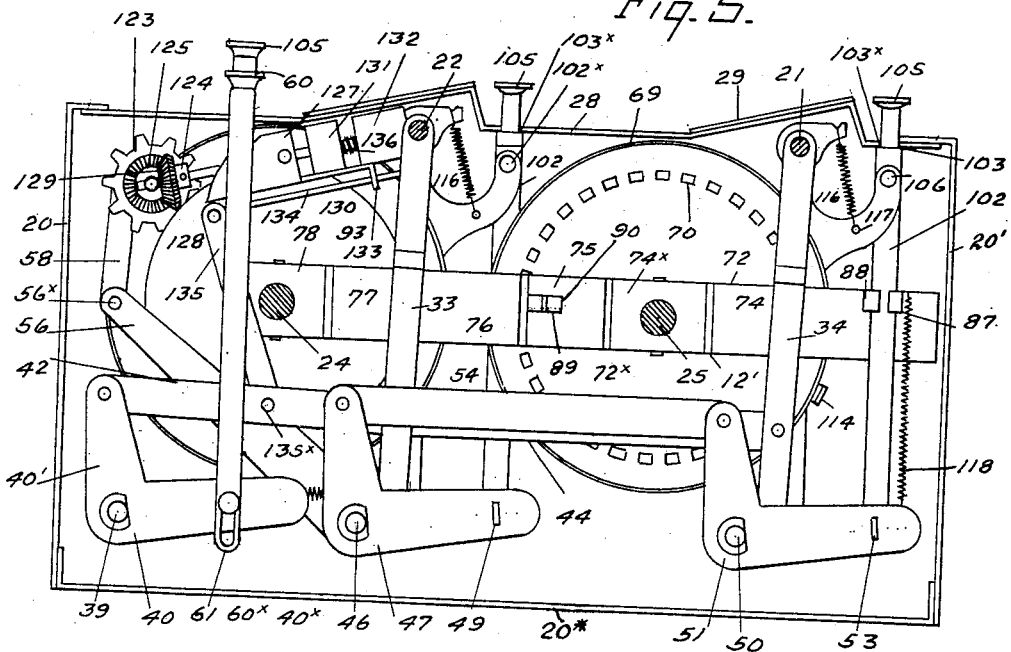
Fig. 5.
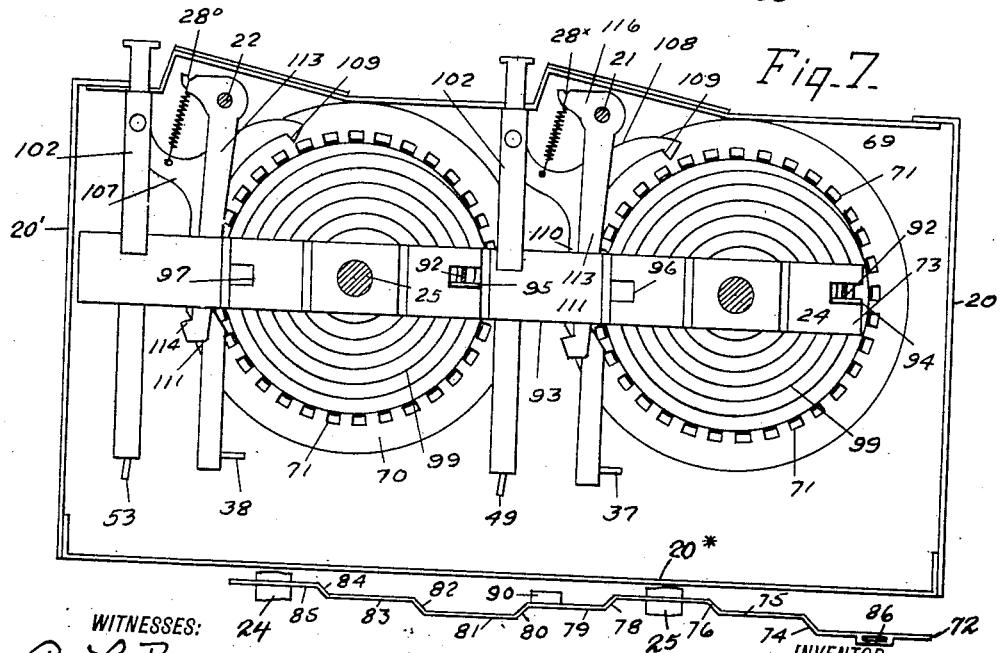
Fig. 7.
WITNESSES:
C. L. Brown
S. L. C. Hasson
INVENTOR
Charles A. Bunker
BY
Richard Manning
ATTORNEY
Fig. 9.

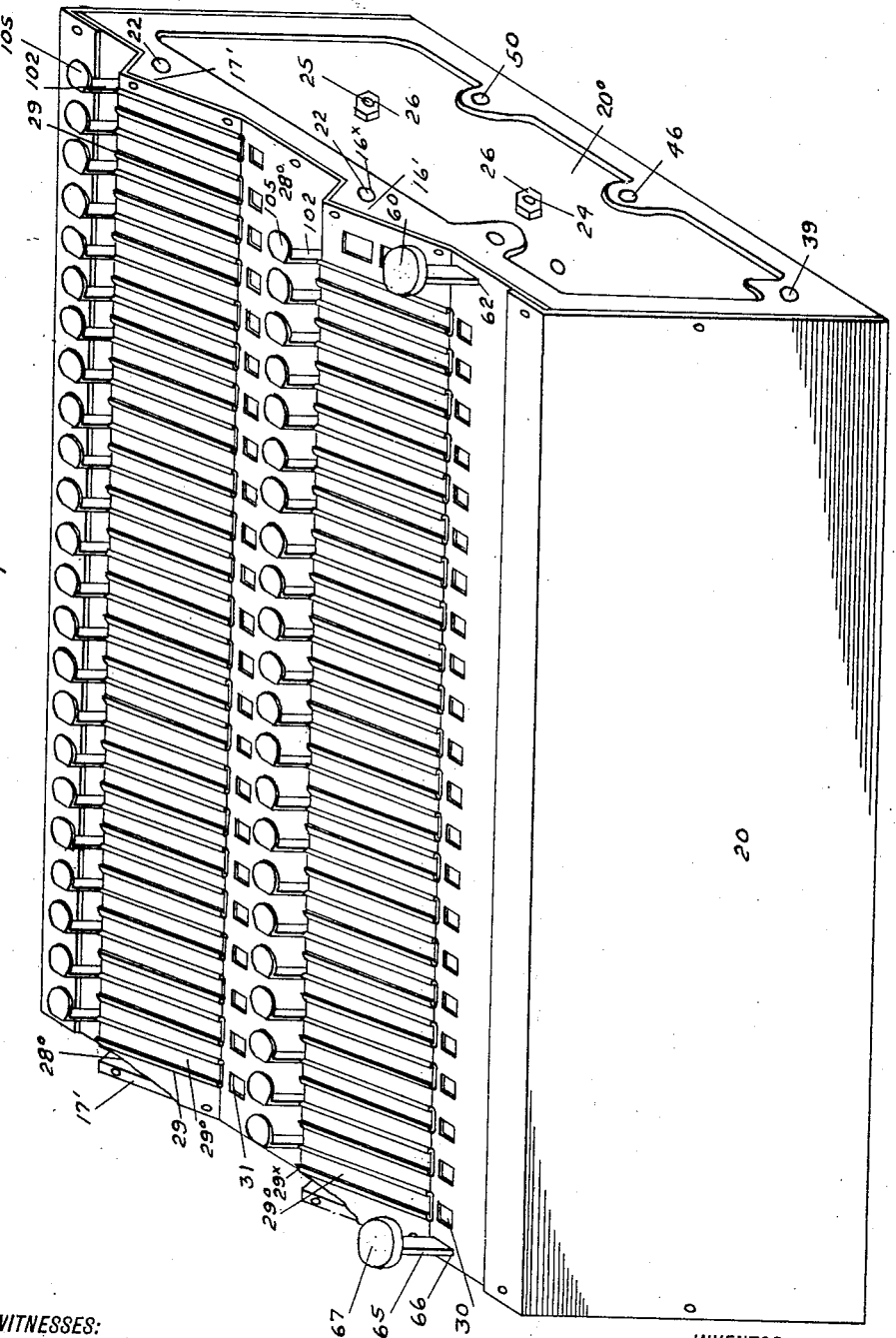

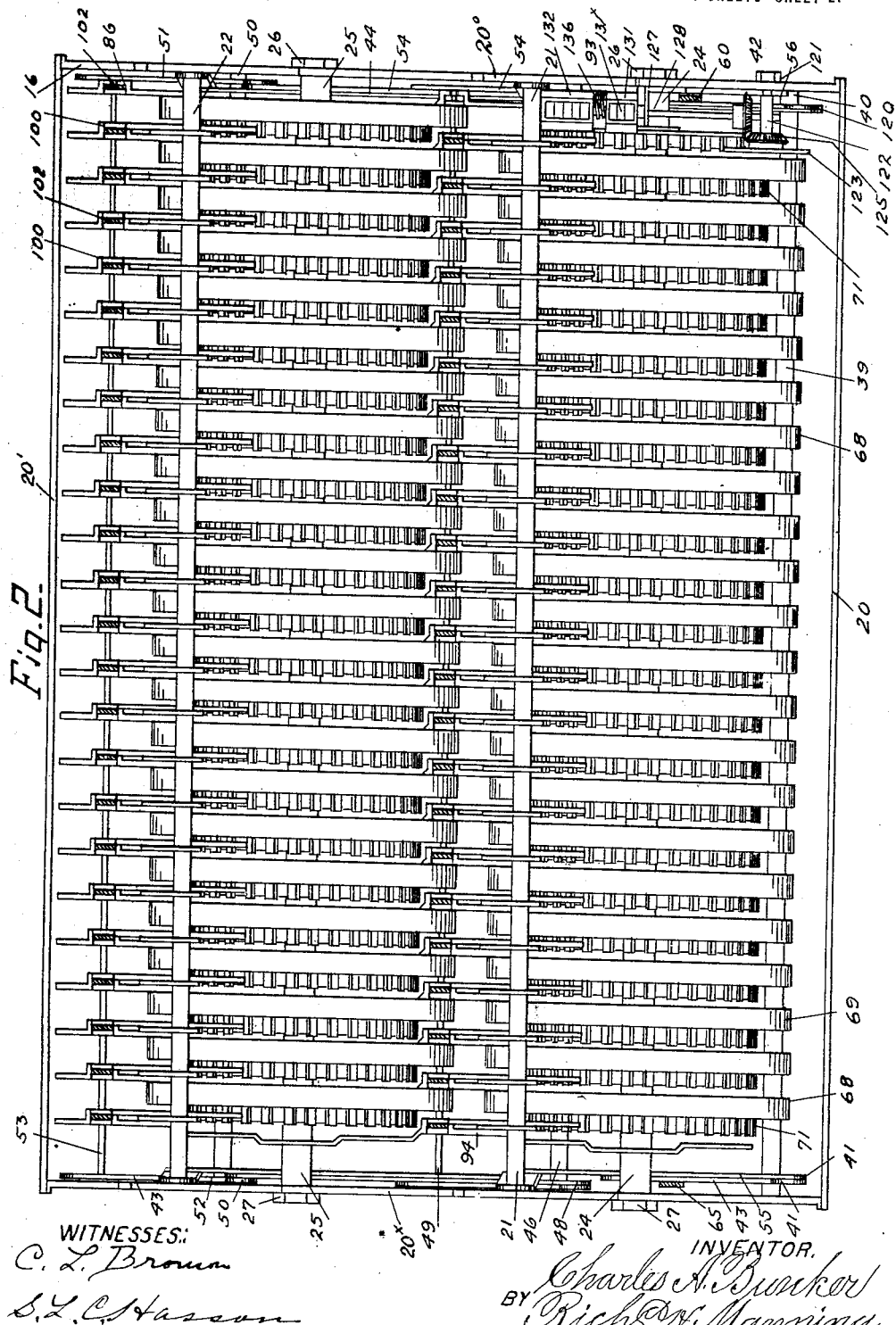

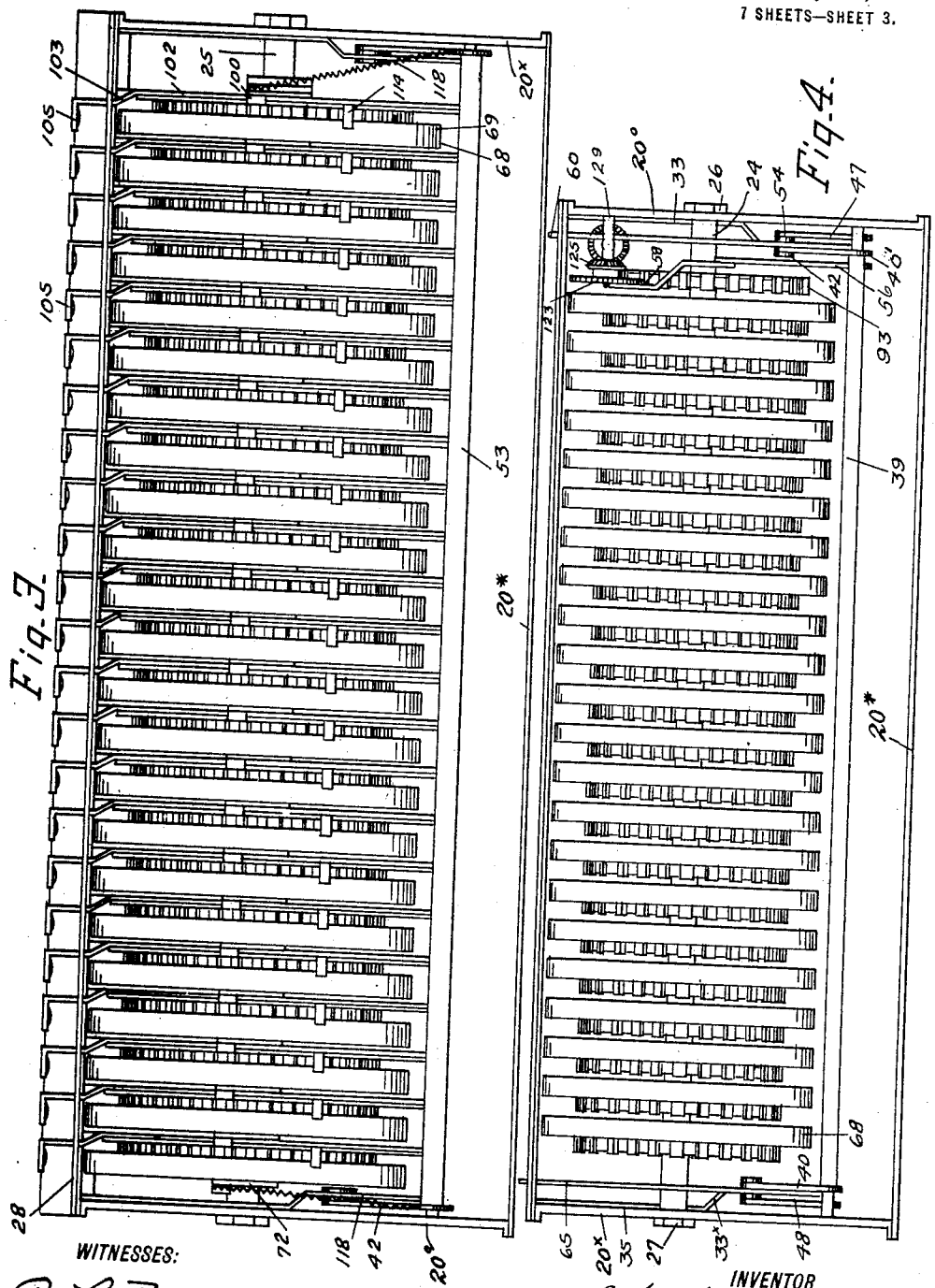

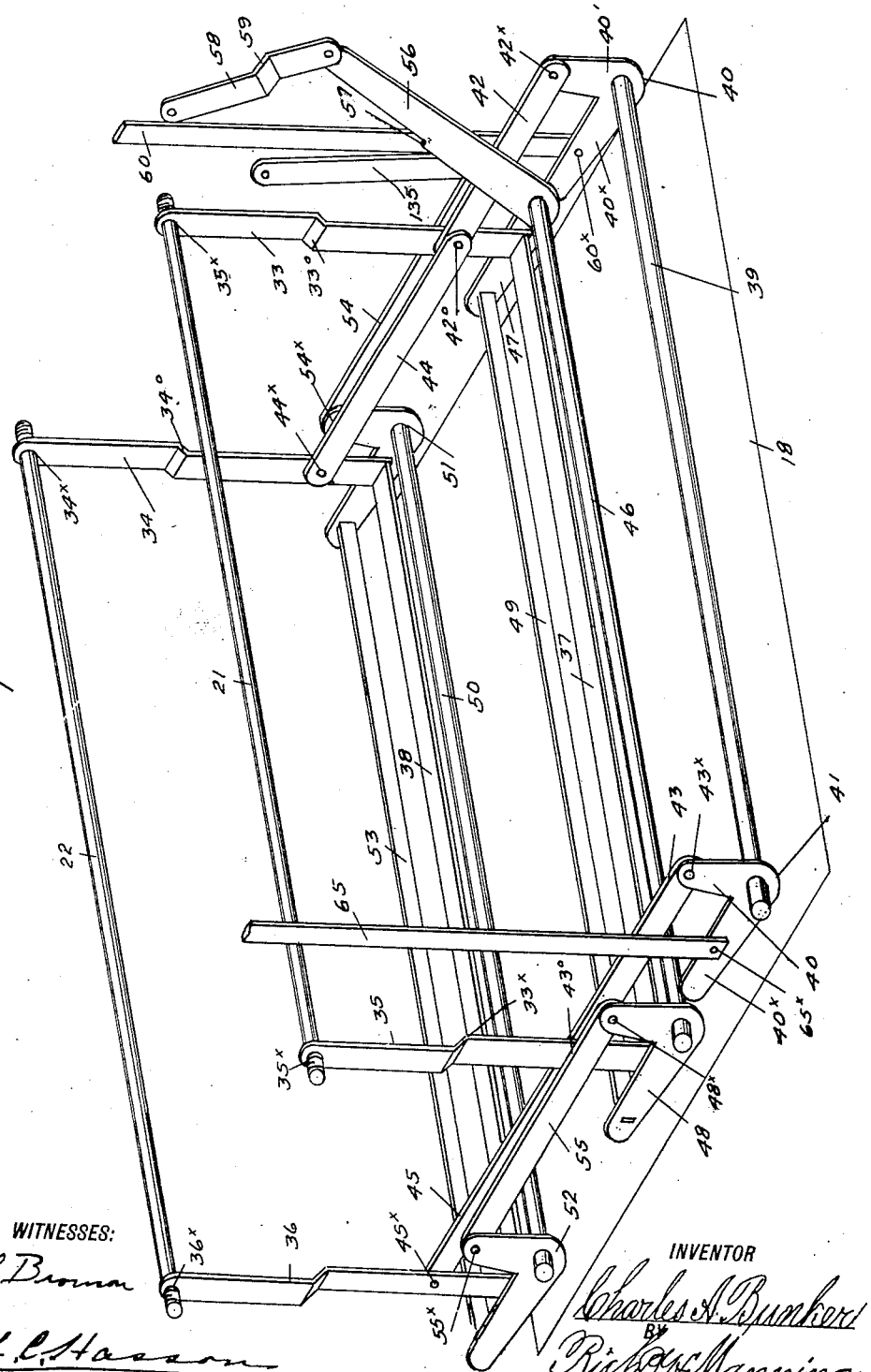

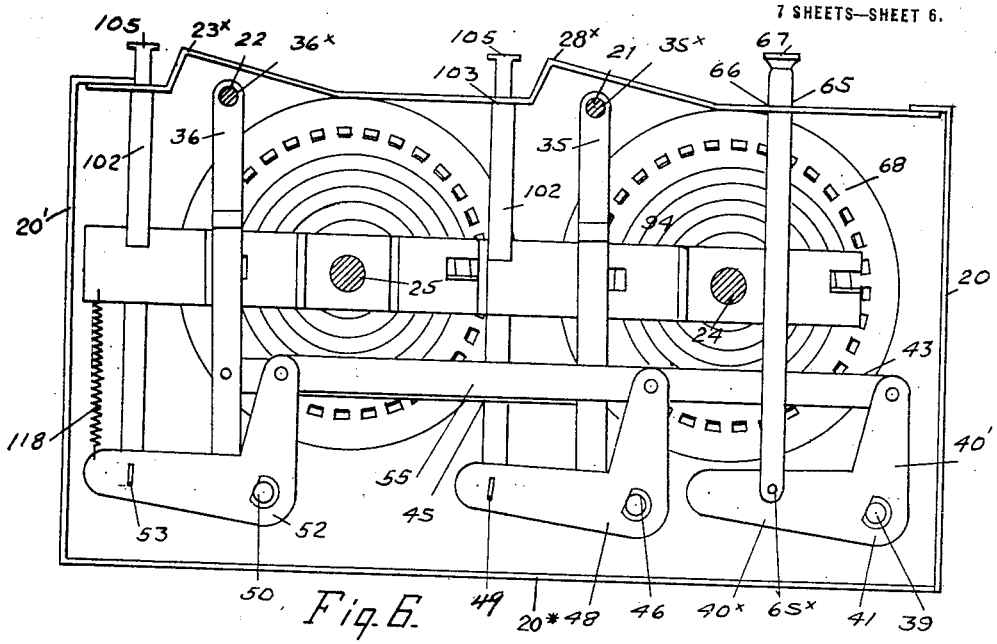
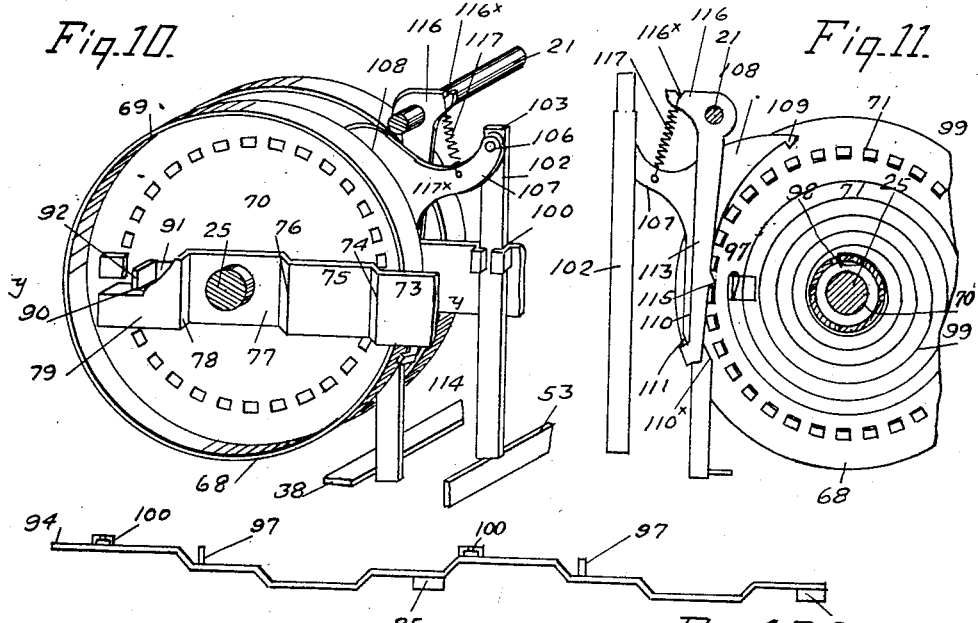
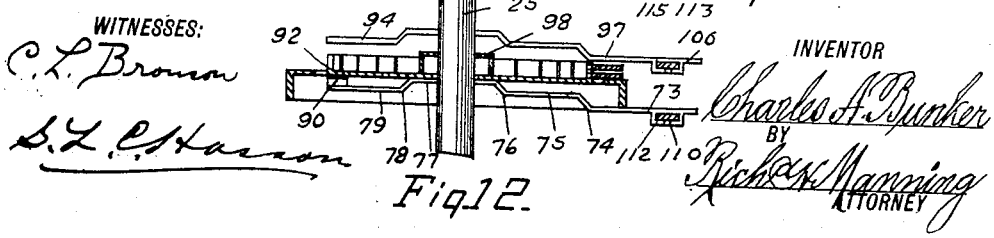

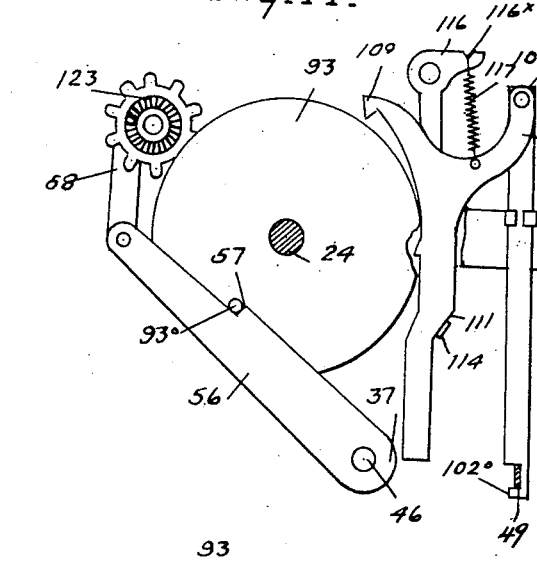
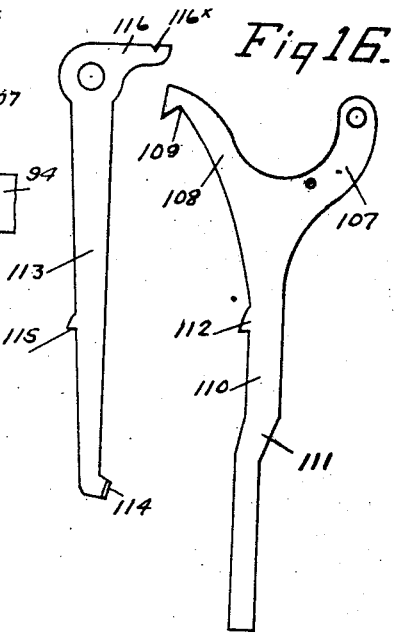
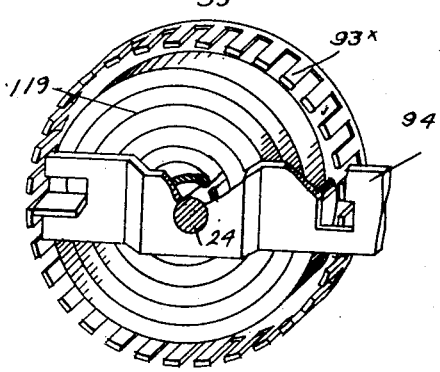
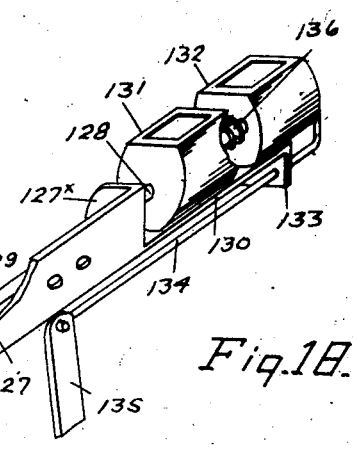

UNITED STATES PATENT OFFICE.

CHARLES A. BUNKER, OF KANSAS CITY, MISSOURI.

LAUNDRY-REGISTERING APPARATUS.

1,311,315.   Specification of Letters Patent.   Patented July 29, 1919.

Application filed August 14, 1916. Serial No. 114,828.

*To all whom it may concern:*

Be it known that I, CHARLES A. BUNKER, a citizen of the United States of America, residing at Kansas City, in the county of Jackson and State of Missouri, have invented certain new and useful Improvements in Laundry-Registering Apparatus; and I do hereby declare that the following is a full, clear, and exact description of the invention, reference being had to the accompanying drawings, forming a part of this specification.

The invention relates to apparatus for registering numerically a list of items, and adding the composite numbers, and is particularly adapted to the registration of laundry articles, and it has for its object new and novel means for rectifying mistakes in listing, and in which the results are corrected automatically.

The invention consists in the novel mechanism and its associated parts, first duly described and then specifically pointed out in the claims.

Referring to the drawings:

Figure 1 is an isometric view of the case, inclosing the mechanism, taken from its rear end, and showing the record tablets upon the top, and also showing the series of push bars actuating the record indicators, the key bar for correcting an error in the numerical record indicators, and the release push bar for restoring all of the indicators to their initial positions.

Fig. 2 is a plan view of the registering and adding mechanism, as seen, with the top plate of the case removed.

Fig. 3 is a side view of the mechanism, taken from the right-hand side of the case, the side plate being removed.

Fig. 4 is a side view of the mechanism, taken from the left-hand side of the case, and upon a reduced scale, the side plate being removed.

Fig. 5 is a view of the mechanism, taken at the forward end of the case, or at the right hand, as seen in Fig. 1, the side plates being removed, and showing the adding and accumulating mechanism, and one of the indicator wheels and its actuating push bar, and the correcting or single spacing key bar.

Fig. 6 is a view of the mechanism at the forward end of the case, or at the left hand, as seen in Fig. 1, the end plate being removed showing the indicator or record wheels adjacent said end, and their actuating push bars, and the key bar for restoring all of the indicator wheels to their normal positions.

Fig. 7 is a transverse, vertical, sectional view, taken through the case upon the line $x$, $x$, in Fig. 2, looking rearwardly, showing the indicating wheels upon one side of a division plate, and the trip and rocking bars in section.

Fig. 8 is an enlarged, detail view, in perspective, of the push bar releasing or setting mechanism, showing the single space writing key bar, the arresting bar to the accumulation operating wheel, and the key bar, which restores all of the indicator wheels to their normal positions.

Fig. 9 is a plan view of the outer, transverse plate on the shafts carrying the indicator wheels.

Fig. 10 is a detail, isometric, front view of contiguous indicator wheels in the series, showing the division plates on the wheel-supporting shafts, also showing one of the wheel actuating push bars, the spring supported escapement and the operable bar and dog, and portions of the bar and escapement releasing, oscillating and trip bars.

Fig. 11 is a rear side view of one of the indicator wheels, showing the wheel actuating escapement releasing bar and push bar, as seen in Fig. 10.

Fig. 12 is a horizontal, sectional view, taken through one of the indicator wheels and division plates, in line $y$, $y$, in Fig. 10, showing the lugs on the division plates, with which the spiral springs on the respective indicator wheels are connected.

Fig. 13 is a plan view of one of the division plates, between contiguous indicator wheels, as seen in Figs. 2 and 3, showing the wheel rotating stops or lugs.

Fig. 14 is a detail, front, side view of the counter wheel-actuating mechanism, and the automatic wheel controller.

Figs. 15 and 16 are detail, side views of the dog, the escapement and escapement bar, respectively.

Fig. 17 is a rear, side view of the large cog wheel of the counter wheel-actuating mechanism.

Fig. 18 is a detail view, in perspective, showing the fixed and movable counter wheel boxes, the counter wheel shaft, and the combined cog and bevel gear wheels, and the bevel gear wheel on the counter shaft, and the rod and wheel controlling bar actuating the movable counter wheel box.

Fig. 19 is a side view of the fixed and movable counter wheel boxes, a portion of the movable box being broken away, to show the accumulator counter wheel at the rear end of the box, and the clutch connections on the wheel and shaft.

Similar numerals of reference indicate corresponding parts in all the figures of the drawings.

The registering devices, as seen in the drawings, to which reference is made, consists of indicator wheels, commonly employed in the various forms of registers, and which are of the same circumference and alike in construction as the wheel 68, as seen in Fig. 10, being a replica of the others, said wheel having a peripheral flange 69, extending from the web 70. Extending from the web 70, a short distance inwardly in the same direction as flange 69, is a lug 92. From the web 70, and in the opposite direction to the lug 92, extend the cogs or teeth 71, arranged a short distance inwardly and concentrically to the periphery of the wheel. These cogs are shown stamped out from the web 70. From the web 70, in the same direction from the web as cogs 71, extend a lug 92, said lug being upon the other portion of the web diametrically in line with the lug 92. In the central portion of web 70 is an axial opening 70'. Extending around said opening, and secured to the web 70, is an annular plate or ring 98, with which is connected one end of a coiled spring 99, the other end of which spring is connected with the lug 92. The registering wheels are mounted loosely upon the parallel non-rotating shafts 24 and 25, which extend through the end plates 20×, 20°, of the case, and are screw threaded and provided with the nuts 26 and 27, respectively (see Figs. 1 and 4). The wheels upon the respective shafts 24 and 25 are arranged with their flanged portions extending toward the forward end plate 20×, and the wheels turn clock-wise upon the shafts.

Upon shafts 24 and 25 are mounted the wheel-separating plates 94, as seen in plan in Fig. 13, which extend transversely to the case and are bent to enter past the flanges 69, and toward the web 70, of the opposite wheels, on both shafts 24 and 25. Upon these plates are lugs 96 and 97, which are in the path of the respective lugs 92, on the respective wheels, and come in contact upon the recoil or return movement of the wheels. At the forward end of the case and adjacent the end plate 20×, is a transverse plate 72, mounted on the shafts 24 and 25, and provided with the lug 90, for the single indicator wheel on shaft 25, the wheel on shaft 24, alined with said indicator, which being the cog wheel 93 which forms part of the resisting mechanism hereinafter described.

The plate 72, in Fig. 9, is also bent at the points 74, 76, 78, 80, 82 and 84, to extend past the flanges of the indicator wheel toward the web, as seen in Fig. 13.

Upon the outer surface of the flanges 69, of the indicator wheels, are the digits 69×, beginning upon each wheel, at the portion held by its lug 92, in a normal, recoiled position with the numeral 1, and including the numerals in order from 1 to 35, inclusive, the numerals being equally spaced apart. In the top plate 28, of the case, above each indicator wheel in the respective shafts 24 and 25, are the respective sight openings 30 and 31.

The adjustors for the indicator wheels consist of the push bars 102, one to each wheel, and vertically movable in the guide sockets 100, on the transverse wheel-dividing plates 94 and the socket 86, on the front transverse plate 72. The upper end of the push bar extends through the opening 104, in the top plate 28, of the case, and is bent or inclined forwardly at an oblique angle to the bar beneath the top plate at 103, as seen in Fig. 3, these inclined portions being of lesser width than the bar, to form a shoulder 103×, as seen in Fig. 5, which shoulder limits the upward movement of the bar. These bars are provided with a head 105. With the bar 102, immediately below the bent portion 103, is pivotally connected, at 106, a curved arm 107, which is located on the upper end of a releasing bar 110, the lower end of which bar extends below the lower end of the push bar.

A separate curved arm 108, extends from the upper end of bar 10, which is curved, and extends toward the cogs 71, on the indicator wheel 68, and is provided with a hook or catch 109. A portion of the bar 110 two-thirds the distance from the arm 108 to the lower end of the said bar, is bent at 110×, at an oblique angle, to form an inwardly and downwardly-inclined shoulder 111. Upon the lower portion of bar 110, between arm 108 and the shoulder 111, is a detent 112, which engages with the cogs on the indicator wheel 68.

In the top member 28, of the case, are upwardly-raised inclined portions 28×, the highest portion being opposite the upper ends of the push bars 102, beneath which portions are the rods 21 and 22, and the ends of which rods extend through the respective end members 20×, 20°, of the case. With these rods are pivotally connected the dogs 113, the lower end of the dogs extending downwardly upon the side of the bar 110, to a position against the inclined shoulder 111, and upon said end of the dogs is a flange 114, which bears upon the shoulder 111, on the bar 110, said flange being inclined at an angle corresponding to the said shoulder. Upon the inner edge of the dogs 113 is a detent 115, said detent being upon a line horizontally with the detent 112, on the bar 110. Upon the pivoted, upper ends of the dogs 113 and shoulders 116, having notches 116ˣ, with which are connected one end of the coiled spring 117, the other end of which spring is secured within the opening 117ˣ, in the curved arm 107, both the push bar 102 and the releasing bar 110, being under suspension by the spring.

Upon the inclined, raised portion 29, of the top member 28 of the case, are tablet holders 29′, in which are the strips 29°, bearing the name of the article listed.

The re-setting mechanism consists of the vertical, oscillating bars 33 and 34, adjacent the forward member 20ˣ, and the oscillating bars 35 and 36, adjacent the rear end member 20°, of the case, the bars 33 and 35 being pivotally connected with the rod 21, and the bars 34 and 36 with the rod 22, upon which the dogs 113 are pivotally connected. In the bars 33 and 34 are bent portions or offsets 33°, 34°, and in bars 35 and 36 the offsets 35°, 36° (see Fig. 8).

37 and 38 indicate the releasing trip bars for the detent-releasing bars 110, and extend in the longitudinal direction of the case and are arranged with the surfaces in a horizontal position, and are connected at their respective ends with the lower ends of the respective oscillating bars 33 and 35, and also with the respective bars 34 and 36.

46 and 50 indicate rock shafts, which extend longitudinally of the case, and are alined with the respective trip bars 37 and 38, and toward the side member 20 of said case, from said bars, the ends of which rock shafts are journaled in the respective end members 20ˣ, 20°, of the case. Upon the rock shaft 46, and close in position to the said end plate 20ˣ, 20°, of the case, are fixed the respective bell crank levers 47 and 48, and upon the rock shaft 50 are fixed the respective bell crank levers 51 and 52, the lower arm of each lever being of increased length, the arms on levers 47 and 48 extending past the lower ends of the oscillating bars 33 and 35, and the lower arms on the levers 51 and 52 being extended past the lower ends of the oscillating bars 34 and 36, and with the said extended ends of the arms on 47 and 48 are connected the ends of a longitudinal bar 49, and with the extended ends of the lever arms 51 and 52 is connected the ends of a longitudinal bar 53, both bars being arranged edge-wise in position and extended beneath each of the push bars 102, to the respective indicator wheels 68, while the longitudinal bars 37 and 38 extend transversely to and upon the inner side of the bars 110, carrying the detent 112.

With the upright short arms of the bell crank levers 47 and 51 are connected pivotally the respective ends of a connecting bar 54, and with the upright arms 48 and 52 are connected, respectively, the ends of a connecting bar 55. The long arms of the bell crank levers are supported under tension by the spiral springs 118, secured at one end to said arms, and to the transverse plate 72 and 94, and the ends of the shafts 24 and 25 (see Figs. 3, 5 and 6).

The means for actuating the trip bars 37 and 38 consists of a rock shaft 39, extending the length of the case and adjacent the side member 20, of the case, the ends of which shaft are journaled in the respective end members 20ˣ, 20°, of the case. Upon said shaft are fixedly secured the bell crank levers 40, 40′, having long arms 40ˣ. With the upwardly-extended short arms of the said bell crank levers are pivotally connected the outer ends of the bars 42 and 43, the inner ends of which are pivotally connected with the inner portions of the oscillating bars 33 and 35, upon the points 42°. With these pivots are connected the inner ends of the connecting bars 44 and 45, the outer ends of which bars are pivotally connected at 44ˣ, 45ˣ, with the oscillating bars 34 and 36, respectively.

60 indicates a single spacing releasing bar, which extends through the opening 62, in the top member 28, of the case, and is provided with a slot 61, in its lower end. Upon the outer side of the long arm of the bell crank lever 40, between the shaft 39 and the end of said arm, is a pivot 60ˣ, extending within slot 61, of bar 60 (see Fig. 5).

65 indicates the release push bar for all of the detents of the indicator wheel-actuating devices, which bar extends through the opening 66, in the top member 28, of the case, and is pivotally connected at its lower end with the outer side of the long arm of the bell crank lever 41, between the shaft 39 and the end of said arm (see Fig. 6).

The adding member consists of a register-transmission cog-wheel 93 (see Fig. 17), upon the non-rotating shaft 24, the circumference of which is the same as that of the gear on the indicator wheels. This cog-wheel 93 is provided with teeth or cogs 93ˣ, upon its periphery, extending inwardly. A coiled spring 119 is secured to the hub of the wheel, and the transverse bar 94, in precisely the same manner as the spring 99 on the indicator wheels.

The actuator for the cog-wheel 98 consists of a vertical bar, which is precisely the same as the actuating bar 110, to the indicator wheels, and the dogs 113, with their respective detents 112 and 115. The push bar 102 is cut off at its upper end at 102*, at its pivotal point of connection with the arm 107. The lower end of the bar 102 extends below the vibrating bar 49, and is notched at 102ª, to receive said bar, and is actuated when any one of the push bars is moved downwardly upon either vibratory bar 49 or 53.

Upon the upper portion and inner side of the end plate 20ˣ, of the case, is secured a stud shaft 120, upon the end of which shaft is rotatably mounted the small cog-wheel 123, upon the inner portion of which is a hub 124, upon which hub is secured a bevel gear wheel 125. Upon the stud shaft 120, between the hub 124 and the side member of the case, is a sleeve 122.

Through a short, inwardly-bent portion 127ˣ, of the angle bar 127, secured to the upper portion of the end plate 20ˣ, of the case, extends loosely the rotary counter wheel shaft 128, the forward end of which shaft is journaled in an opening in the side of sleeve 122, on the stud shaft. Upon said counter wheel shaft 128 is mounted a reversing bevel gear wheel 129, the teeth of which are in mesh with the teeth of the bevel gear wheel 125, on stud shaft 122. A plate 131 is connected rigidly with the rear end of the horizontal portion of the angle bar 127, upon which plate is secured the counter wheel box 131. Upon said plate 131, in rear of the counter wheel box 131, is slidingly mounted a counter wheel box 132, through which boxes extend the rear end of the counter shaft 128. Within the counter wheel box 131, and mounted on shaft 128, are the ordinary counting wheels for adding the totals of the actuations of the indicator wheels, and in the box 132 are cumulative counter wheels, which accumulate such actuations, in a period of time. Through the rear end of the counter wheel box 132 extends one portion 137, of a clutch, which portion is connected rigidly with the counter wheel at said rear end of the box (see Fig. 19), the rear end of the counter wheel shaft being journaled in the side of the non-rotating shaft 21. Upon the counter wheel shaft 128, adjacent the shaft 21, is secured by the pin 138ˣ, the other portion 138 of the clutch.

With the rear end of the counter wheel box 132 is secured rigidly the upwardly-bent end of a rod 134, which is movable loosely through the downwardly-extended rear end portion 133, of the plate 132, supporting the counter wheel box.

135 indicates the actuating bar for the rod 134, which is pivotally connected at its lower end with the inner side of the connecting bar 42, connecting bell crank lever 40, with the oscillating bar 33. The upper end of the bar 135 extends at an angle to bar 42, and at its upper end is pivotally connected with the movable rod 134. On the counter wheel rotary shaft 128, between the counter wheel boxes 131 and 132, is a spiral spring 136, extending around the shaft, and its ends bearing against the opposite ends of the respective counter wheel boxes.

The rotary motion of the cog-wheel 93, is governed by the rotary movement of the small cog-wheel 123, with which is pivotally connected one end of a crank arm 58, which is bent outwardly at 59, as seen in Fig. 8, and its lower end pivotally connected with the upper end of a check bar 56, the lower end of which bar is pivotally connected with the rocking shaft 46, carrying the bell crank levers 47 and 48. The inner edge of the bar 56 is cut longitudinally away from its upper end downwardly a little more than one-third the distance toward its lower end, so as to form a notch or stop 57. Upon the side of the web of the wheel 93 is a pin 93ˣ, which at the proper time engages with the notch 57.

In operation a downward movement upon a wheel actuating push bar 102 draws downwardly the bar 110, connected therewith, expanding the spring 117, the detent 12, on said bar 110, moving the indicator wheel one step, and the numeral upon its periphery beneath the sight opening 30 or 31, above the wheel, the wheel being held against the retraction of the coiled spring 99 by the detent 115, upon the dogs 113. Upon a release of the push bar, it moves upwardly, and with it the bar 110, its detent 112 engaging with the cog on the indicator wheel, held by the detent upon the dogs.

The actuation of the reciprocating bars 49 and 53 is transmitted to the actuating bar 102, to the cog-wheel 93, which moves in the same direction as the indicator wheels, and a corresponding distance the cogs, which number thirty-three, on said wheel, impart to the small spur wheel 123, upon which are ten cogs, a partial revolution equivalent to the distance moved by the cog wheel, and from said spur wheel motion is transmitted through the bevel gear wheels 125 and 129, to the counter wheel shaft 128, and to the counter wheels in the boxes 131 and 132, the counter wheels indicating the actuations of each push bar and the total result, in the ordinary manner.

The application of the apparatus to such purposes as listing articles of like character, necessitates re-setting of one or more of the indicator wheels, and in so doing the push bar opposite the indicator wheel to be re-set, is pushed down and held for connection in such position. The spacing bar 60 is then pushed down as far as permitted by its head or cap, and the slot 61, in the lower end of the bar, limits the movement downwardly, of the long arm of the bell crank lever, in which movement the trip bars 37 and 38 are oscillated, these bars being under the pressure of the springs 117, and one of said bars is moved against the lower end of the bar 110, in its path of movement, and moving the detent 112 on the bar 110, from engagement with the cog of the indicator wheel. The wheel being now held by the detent upon the dogs, the push bar 102 may be operated to move the indicator wheel one space forwardly against the tension of the spring, or one space rearwardly, as a movement is given upwardly or downwardly of the push bar, the alternate engagement and disengagement of the detents 112 and 115, on the respective bar and dogs, being effected by the sliding movement of the inclined portion 111, on the transverse lug 114, on the dogs, whereby the detent 115, on the dogs, is moved out of engagement with the cog on the indicator wheel, in the motion imparted to the wheel by the push bar. The hook 109, on the arm 108, of bar 110, does not engage with the cogs upon the indicator wheels, unless the push bars are forcibly operated, as well as the trip bars, in which instance the wheel is held immovable.

In every re-setting movement in which the connecting bars 42, to the bell crank levers 40 and 41, are actuated by the release bar 60, the pivoted bar 135 is moved thereby, and rod 134 connected with the counter wheel box 132, drawn through its bearing, and the counter wheel box 132 moved toward the counter wheel box 131, compressing the spring 136, and disengaging the portion 137, of the clutch, from the portion 138, and the counter wheels in said box 132, and a reverse movement of the counter wheels is checked.

In the same movement of the actuating bar 102, the cog wheel 93 acts synchronically as a timer or regulator for determining the time of registration, and is moved one tooth, which moves synchronically the small spur gear 123 one tooth. When the wheel 93 has made a complete revolution, the arm 56 has moved upwardly and downwardly three times, and on the first revolution will be on the downward stroke and far enough to permit the pin 93°, on said wheel, to pass out of contact with the bar 56. On the second revolution the bar 56 has started in its upward movement, but does not engage with the pin 93°. On the third revolution of the wheel 93, the bar 56 strikes the pin 93°, without engaging with the notch 57, which limits the motion of the push bars and upon a downward movement of the release bar 65, which releases all of the trip bars, the actuator of the wheel 93 is released, and the said wheel reverses its position until the pin 93° engages with the notch 57, on bar 56, as seen in Fig. 14, in which position the wheel 93 is in readiness for another rotary movement.

Such modifications of the invention may be employed as are within the scope of the appended claims.

Having fully described my invention, what I now claim as new and desire to secure by Letters Patent is:

1. In re-setting mechanism for register-actuating devices, the combination with a self-reversing rotatable indicating wheel, and with teeth on said wheel, of pivoted dogs, a detent on the dogs for checking the movement of the wheel, a push bar, and a vertically movable wheel-actuating bar, a detent on said bar, and an arm pivotally connected with the push bar and yieldingly supported from the arm on said dogs, means co-acting with the lower end of said dogs and the wheel-actuating bar to move the detent on the dogs out of engagement with the teeth on said indicator wheel, and a trip bar movable against the vertically-operable bar and held against said bar against the tension of said spring during a corrective movement of the push bar to move the indicator wheel in a forward and reverse step-by-step movement.

2. In re-setting mechanism for registering apparatus, the combination with the registering wheels, and actuators, of a series of alined pivoted bell crank levers having long and short arms, and bars connecting with the alined bell crank levers, and vibrating bars upon the short arms of said levers in the path of movement of said actuators, trip bars movable in the direction of and releasing said actuators, counter wheels and accumulating wheels, and separate fixed and movable boxes inclosing said counter wheels and accumulator, respectively, a support for said boxes, and an expanding spring between said boxes, said accumulator box having an opening in its outer end, a clutch having one part connected with one of said accumulators, and the other part with the support for the said boxes, a device connected with the movable box for moving the box against the pressure of said spring and disengaging the clutch, a synchronous mechanism actuated by the vibrating bar, in the path of the actuators, communicating motion to said counter wheel shaft, and a releasing key bar pivotally connected with the long arm of one of said pivoted bell crank levers.

CHARLES A. BUNKER.

Witnesses:
 ROBERT O. McLIN,
 ANNIE L. GREER.